Figure 1:
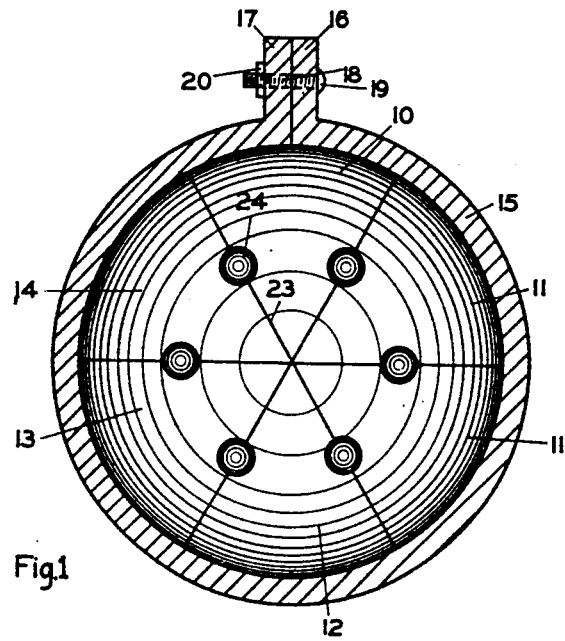

June 17, 1930.  W. W. BEACH  1,764,925
SUN'S RAYS MAGNIFYING LENS
Filed June 2, 1928

Will W. Beach
INVENTOR:

Patented June 17, 1930

1,764,925

UNITED STATES PATENT OFFICE

WILL W. BEACH, OF LOS ANGELES, CALIFORNIA

SUN'S RAYS MAGNIFYING LENS

Application filed June 2, 1928. Serial No. 282,313.

This invention relates to improvements in magnifying lenses and has for its object to provide a simple, efficient and inexpensive device of this character.

One of the objects of this invention is to provide a lens in sectional form, whereby a plurality of similarly sized and similarly shaped segments may be quickly brought together and joined into a single unit.

Another object of my invention is to provide a sectional lens with means for clamping together all the component parts of the completed lens so that the resultant structure will have the desired focus and magnifying power.

Where there is a transportation problem involved in connection with large size lenses my invention is designed to render the problem solvable inasmuch as the lens may be built up to any desired size from relatively small, compact segments which take but little room for storage and hauling, and which can readily be united and disunited at will.

A still further object of my invention is to provide each segment of my sectional lens with a tiny semispherical complemental socket so that when the mating segments are joined together with their edges coinciding the sockets may receive tiny balls, that will be cemented first into the semispherical sockets of one segment, then in that of the adjacent segments; in this manner the segments will register to better advantage and as the balls are themselves transparent it will be seen that the completed lens will deliver its full amount of focusing power.

With the above and other objects in view my invention consists in the arrangement, combination and details of construction disclosed in the drawings and specification, and then more particularly pointed out in the appended claim.

Figure 2:
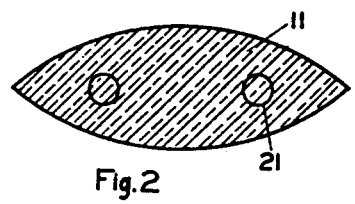
Figure 3:
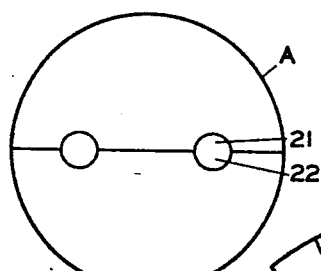
Figure 4:
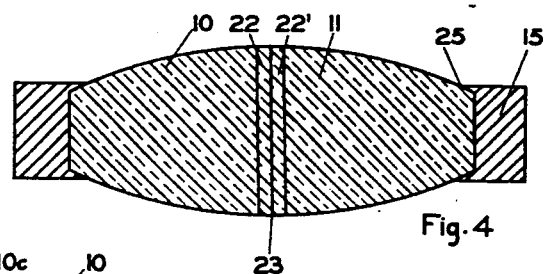
Figure 6:
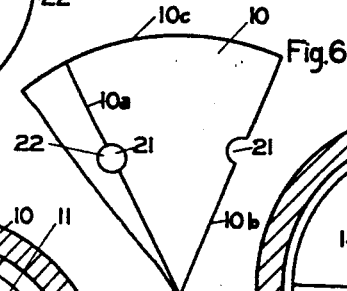
Figure 5:
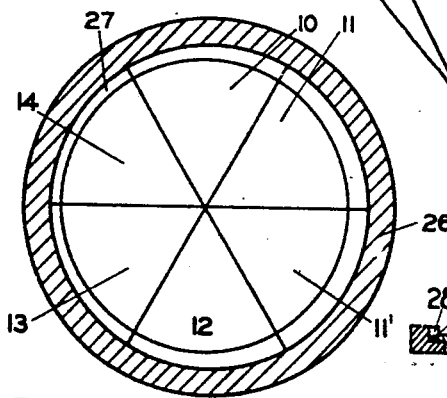
Figure 7:
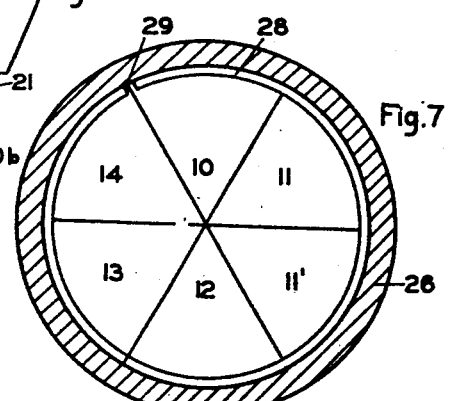
Figure 8:

In the drawings wherein similar reference characters designate similar parts throughout the respective views, Figure 1 is a cross sectional view of one form of my invention, Figure 2 is a longitudinal section thru one style of lens admitting of sectional construction, Figure 3 is a plan view of a two-section lens, Figure 4 is a cross sectional view showing a sectional lens mounted in a modified frame, Figure 5 is a top plan view, partly in section, of a sectional lens, Figure 6 is a fragmental detail view of a lens segment, Figure 7 is a cross sectional view of a sectional lens with a novel lens retainer, and Figure 8 is a cross sectional view taken at right angles to Fig. 7.

In the drawings, which are merely illustrative of my invention 10 designates any number of segments of a circular transparent lens, the opposing edges of which are designated $10^a$ and $10^b$ (Fig. 6), while the arcuate shaped rim is designated $10^c$. For the purpose of distinguishing the several segments when they are joined together, in Figure 1, the six segments are respectively designated 10, 11, 11', 12, 13, and 14. They are designed to be embraced and clamped by and in a split band or ring 15 which may have terminal lugs 16 and 17 which will abut together. The ring is crowded against all of the segments peripherally and by tapping a screw threaded bolt 18 into the lugs the lugs may be drawn together so as to close the ring around the segments or the head 19 of the bolt 18 may engage one lug, and a nut 20 engages the bolt to force the other lug 17 into position to hold the ring closed.

I prefer to connect the coinciding edges of the several lens segments together so that they will not separate against pressure applied to them separately. I form semispherical sockets 21 upon the opposing edges $10^a$ and $10^b$ of each lens segment; so that the semispherical sockets of mated segments say segments 10, and 11 are complemental to provide spherical pockets in which may be snugly received and lodged transparent balls 24; it will be seen that these pockets intersect the coinciding edges of mated segments designated by 23 in Fig. 1. These glass balls will be cemented into position in the complemental pockets of the mated segments; first the ball will have its semispherical portion cemented into one socket of one segment; then the next adjacent segment will be joined to the first segment, after being cemented inside, and the remaining semispherical portion of the balls will soon enter into the receiving sockets of the mated segments; when the cement dries the balls will be completely and effectively housed. These balls reinforce the coniciding edges of the several segments and considerably strengthen the completed lens. If now the band or ring is sprung around or closed about the rims of all segments, the balls are permanently connected in all the segments severally.

Instead of balls it is also designed to provide grooves 22 and 22' of even width with the segments, the complemental grooves 22, 22' forming bores in which may be poured a molten vitreous vehicle for binding together the segments, so that when this vitreous binder sets or hardens the transparency of the resultant completed lens will not be interrupted at the places where the bores exist.

Two or more segments may in this manner be associated for a single lens mounting. I also design to employ a novel means of binding together the several sections in removable relation if desired; for this purpose a ring, rim or circular frame 26 is employed which is formed with a circular flange 27 upon the inner face of the frame; the several segments are joined together edgewise to complete the disk-like lens; these segments have their arcuate shaped rims resting upon the flange 27 of the frame; I now take a split resilient hoop 28 and spring same into position so as to overlie and press down upon the arcuate edges of all the segments as shown in Figure 7. In this manner upon the removal of the hoop 28 open as at 29 the several segments may be readily removed; while the segments may abut upon the circular flange of the frame; the hoop will exert sufficient tension to frictionally hold the lens segments in associated relation; altho these segments may have their coinciding edges reinforced by means of the balls 24 hereinbefore set forth.

From the foregoing it will be seen that I have devised a form of lens that admits of reducing to compact form the segments thereof; that allows a lens to be shipped in knockdown form, ready to be set up at will; that various sizes of lens and focusing powers may be employed; that means is provided for mounting the segments in associated reation.

I am aware that lenses have been devised in sectional form hereinbefore but I do not claim the general idea of reducing lens to sectional form where these lens present no problems in ultimate size as to transportation; but my invention makes possible the carriage of large heavy lens sections which when united for forming a single magnifying unit will provide a gigantic lens which otherwise could not be transported at all due to its extraordinary size. Nor is my lens intended for magnifying objects, nor for focusing upon objects, nor for rendering objects visible to the naked eye that otherwise would be invisible; the primary purpose of this sectional lens invention is to magnify the intensity of heat focused thru the lens upon any given object to cause the object focused to undergo great increase in heat; in this connection aberrations caused by the seams of interconnected lens segments will not affect the general result of intense magnification and intensifaction of the sun's rays focused thru the lens upon any thing it is desired to melt.

I do not limit myself to the exact details of construction disclosed herein but claim all variations falling within the purview of the appended claim.

What I desire to claim and secure by Letters Patent is:—

As a new article of manufacture a split resilient ring, a plurality of sector-shaped equal sized interchangeable magnifying lenses whose arcuate edges contact flush against the ring and whose opposing lateral edges interengage in abutting relation with the next adjoining lenses whereby a unitary cylindrical lens is provided, a plurality of transparent balls fitting the coinciding edges of the lenses and each extending partially into one and partially into the other of the mated abutting lenses, said balls, holding the lenses against relative compressive movement, said lenses and said balls being cemented with a vitreous material onto their contacting surfaces, and means for drawing said ring in binding relation around all of said lenses.

In witness whereof he has hereunder set his hand this 26th day of May, 1928.

WILL W. BEACH.